United States Patent [19]
Ando

[11] 3,881,061

[45] Apr. 29, 1975

[54] SIGNAL DISCRIMINATOR OF AN AUTOMATIC TELEPHONE ANSWERING APPARATUS

[75] Inventor: Shizuo Ando, Tokyo, Japan

[73] Assignee: Pioneer Electronic Corporation, Ohta-ku, Tokyo, Japan

[22] Filed: Jan. 24, 1973

[21] Appl. No.: 326,222

Related U.S. Application Data

[63] Continuation of Ser. No. 53,625, July 9, 1970, abandoned.

[30] Foreign Application Priority Data

July 11, 1969 Japan .............................. 44-65204[U]

[52] U.S. Cl. ........................ 179/6 R; 179/100.1 VC

[51] Int. Cl. ............................................ H04m 1/64

[58] Field of Search........ 179/100.1 VC, 1 VC, 6 R; 340/148

[56] References Cited

UNITED STATES PATENTS

| | | | |
|---|---|---|---|
| 2,608,608 | 8/1952 | Handschin | 179/6 R |
| 2,815,401 | 12/1957 | O'Dwyer | 179/6 R |
| 3,133,992 | 5/1964 | Dickman | 179/6 R |
| 3,433,897 | 3/1969 | Munson | 179/6 R |
| 3,532,835 | 10/1970 | Kakayama | 179/100.1 VC |

FOREIGN PATENTS OR APPLICATIONS

| | | | |
|---|---|---|---|
| 249,961 | 3/1963 | Australia | 179/100.1 VC |

*Primary Examiner*—Raymond F. Cardillo, Jr.
*Attorney, Agent, or Firm*—Sughrue, Rothwell, Mion, Zinn & Macpeak

[57] ABSTRACT

A signal discriminator for use with an automatic telephone answering apparatus wherein an incoming message from a caller is discriminated from other signals, such as dial tones, busy tones or other noise. The apparatus is continuously operated to record the incoming message as long as the message arrives, and is returned to a stand-by state after the incoming message is finished even if other signals are coming from a telephone line.

5 Claims, 7 Drawing Figures

INVENTOR
SHIZUO ANDO

BY

ATTORNEYS

SIGNAL DISCRIMINATOR OF AN AUTOMATIC TELEPHONE ANSWERING APPARATUS

This is a continuation of application Ser. No. 53,625, filed July 9, 1970, now abandoned.

BACKGROUND OF THE INVENTION

This invention relates generally to automatic telephone answering apparatus, and more particularly to a signal discriminator for an automatic telephone answering apparatus, to discriminate an incoming message from a caller from other various signals coming through a telephone line.

General automatic telephone answering apparatus operates as follows. When a telephone is called, a DC circuit (a talking circuit) of a telephone line is closed and an outgoing message, recorded on a magnetic tape, is reproduced and read out to the caller informing him that the owner of the telephone is absent and that he wants the caller to record a message. At the time the DC circuit is closed, a timer, limiting the total time of the answering operation, begins its operation. After the reading of the outgoing message, a signal, called a beep tone, is sent out to the caller to inform him that a recorder is ready and the caller's message can be recorded for a predetermined time period, for example thirty seconds. After the predetermined time period, the apparatus returns in a stand-by state to await the next call, even if the incoming message continues from the caller. Therefore, in this case, the whole incoming message cannot be recorded. On the other hand, if the incoming message is shorter than the abovementioned period, portions of the magnetic tape in the recorder remain unused while the telephone line remains needlessly occupied.

In a prior apparatus developed to solve these problems, the recorder is continuously operated to record the incoming message as long as the message arrives. However, such prior apparatus mistakes other signals, for example, dial tones, busy tones and other noise, for the incoming message, and the recorder is continuously operated notwithstanding the incoming message has been finished.

SUMMARY OF THE INVENTION

The instant invention provides a novel and improved signal discriminator which eliminates the aforementioned disadvantages of conventional automatic telephone answering apparatus by discriminating between an incoming message and other signals.

The invention further provides a signal discriminator for an automatic telephone answering apparatus whereby a telephone line is not occupied needlessly and magnetic tape for recording incoming messages is not wasted.

Other objects, features and advantages of the present invention will become apparent from the following description and accompanying drawings.

DESCRIPTION OF THE PREFERRED EMBODIMENT

Figure 1:
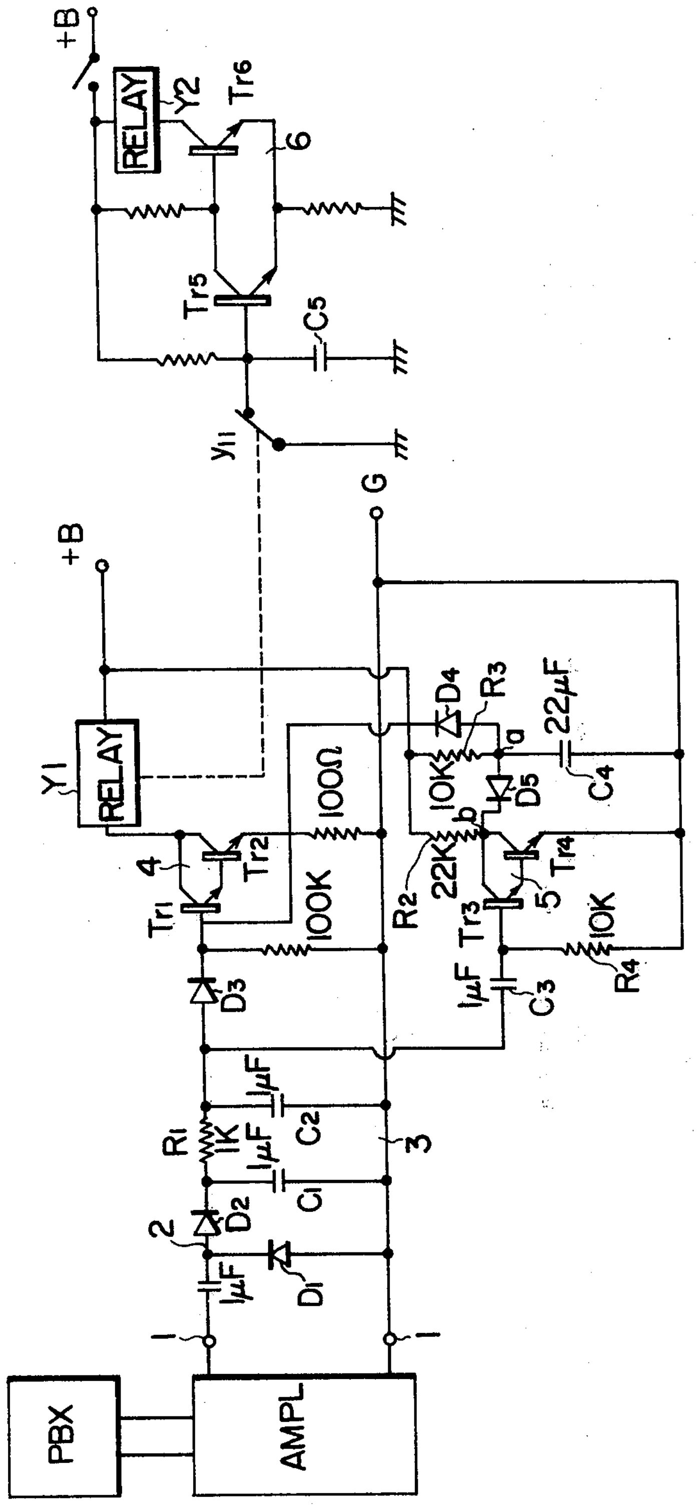
FIG. 1 shows a circuit of one embodiment of the present invention.

Referring to FIG. 1, symbol PBX indicates a private branch exchange. To the PBX is coupled an amplifier, AMP. This amplifies incoming signals from a caller. Output terminals 1 of amplifier AMF are connected to a noise absorbing circuit 3, composed of condensers C1 and C2 and a resistor R1, through a rectifier circuit composed of diodes D1 and D2. The noise absorbing circuit 3 is connected to a switching amplifier 4 through a diode D3 which prevents an inverse current. The amplifier 4 is a Darlington circuit composed of transistors Tr1 and Tr2. A relay Y1, which controls an automatic telephone answering apparatus, is connected to the collector of transistor Tr2.

A switching amplifier 5 is a Darlington circuit composed of transistors Tr3 and Tr4. An output terminal of the noise absorbing circuit 3 is connected to the base of the transistor Tr3 through a condenser C3. The collector of transistor Tr4 is connected to a B+ power supply through resistor R2. Also connected to the B+ power supply is a time constant circuit composed of resistor R3 and condenser C4. The base of transistor Tr1 is connected to a node *a*, the interconnecting point between resistor R3 and capacitor C4, through diode D4. Node *b*, the interconnecting point between resistor R2 and the collector of transistor Tr4, is connected to node *a* through diode D5.

Transistors Tr5 and Tr6 form a Schmitt trigger circuit 6. The collector of transistor Tr6 is connected to a relay Y2 while the base of transistor Tr5 is connected to normally closed contact y11 of the relay Y1. A condenser C5 is connected in parallel with contact y11 such that in its closed position it short circuits the condenser.

Figure 2:
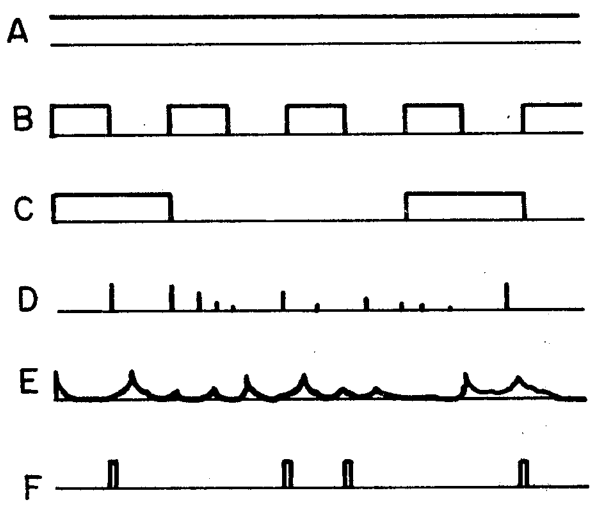
FIG. 2 shows various envelopes of wave forms added into an automatic telephone answering apparatus through a telephone line.
Figure 3:
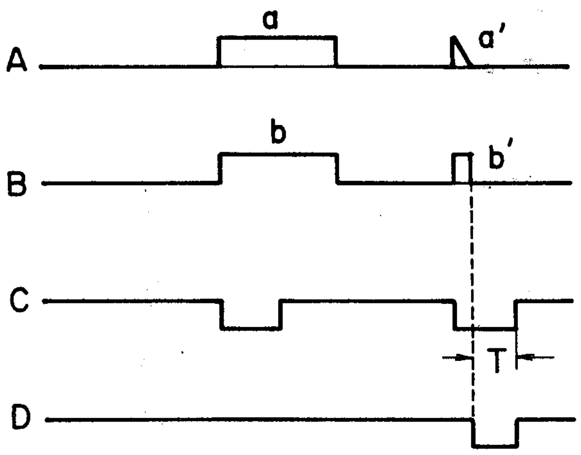
FIG. 3 shows various wave forms appearing at various points in the circuit shown in FIG. 1.
Figure 4A:
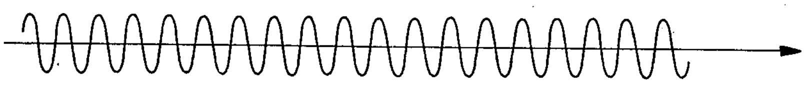
FIGS. 4a–4c show wave forms corresponding to various telephone signals appearing on the telephone line.
Figure 4B:
Figure 4C:

Operation of the above disclosed circuitry will now be explained. FIG. 4*a* illustrates a dial tone, FIG. 4*b* a busy signal and FIG. 4*c* a ringing signal, respectively, which are transmitted over a telephone line. Circuits 2 and 3 rectify these signals, detect the envelopes thereof and absorb any noise therein such that the wave forms illustrated in FIGS. 2*a*, *b* and *c*, respectively, appear at the anode of diode D3. The rectified current, shown as B in FIG. 3, is added into the base of the transistor Tr1 of the amplifier 4 through the diode D3 the relay Y1 is intermittently energized in accordance with the current. The intermittent operation of relay wire Y1 as described above does not include the effect of the control circuit including transistors Tr3 and Tr4. On the other hand, every time intermittent current, corresponding to the busy tone B on ringing current C in FIG. 2, is added into the base of the transistor Tr3 of the amplifier 5 through a differentiation circuit comprising condenser C3 and resistor R4, the transistors Tr3 and Tr4 are turned ON only for a moment. At that moment, as the collector voltage of transistors Tr3 and Tr4 falls, due to the turning on of these transistors, diode D5 becomes conductive and condenser C4 is discharged through diode D5 and transistor Tr4. When transistor Tr4 returns to its OFF state, diode D5 is reversed biased thus blocking the flow of forward current and condenser C4 commences to be recharged. When condenser C4 charges to a voltage, which forward biases diode D4, a current is added to the base of the transistor Tr1 of the amplifier 4 through the diode D4 which causes transistors Tr1 and Tr2 to switch. (The wave form of the current running through the diode D4, at this time, is shown as C in FIG. 3.) That is, when the intermittent current of a duration of at least 0.25 second, shown as "a" of A in FIG. 3, flows, the current in the base of transistor Tr1 is supplied by the current shown as *b* of B and current C in FIG. 3. Under such conditions, transistors Tr1 and Tr2 are held in an ON state which causes the relay y1 to energize continuously. With relay Y1 energized, the contact y11 is in an open condition thus allowing for condenser C5 to be gradually charged. After a certain period, the Schmitt trigger circuit is switched, resulting in transistor Tr5 turning ON and the transistor Tr6 turning OFF. Consequently, the relay Y2 being connected to the collector of transistor Tr6 is released, and the apparatus completes its receiving operation; that is, it returns to a stand-by state to await the next calling.

When a current resulting from a voice signal current E or a transient current F shown in FIG. 2 is added to the base of transistor Tr1 through diode D3, transistors Tr1 and Tr2 are switched according to the current. Consequently, relay Y1 is intermittently energized. On the other hand, when said current (0.25 second or less) is added to the base of transistor Tr3 through condenser C3, transistors Tr3 and Tr4 switch ON, which causes condenser C4 to discharge in the manner previously described. After discharging, condenser C4 is charged again. However, the time constant, determined by condenser C4 and resistor R3, is selected larger than each component of the voice signal current. Therefore, condenser C4 cannot be charged up completely while transistors Tr1 and Tr2 are turned ON by the current b of B as shown in FIG. 3. Thus, current is not added to the base of transistor Tr1 through diode D4, during the period T from the end of current b to the time when condenser C4 is completely charged up. Consequently, relay Y1 is released in the period T as shown D in FIG. 3. That is, when the voice signal current as shown a of A in FIG. 3, which is shorter than the time constant determined by condenser C4 and resistor R3, comes from the telephone line, relay Y1 is intermittently energized. Every time relay Y1 is deenergized, condenser C5 is discharged by contact y11. Consequently, transistor Tr5 is continuously kept OFF while transistor Tr6 is kept ON, thereby keeping relay Y2 continuously energized.

When a dial tone, as shown in A of FIG. 2, comes from the telephone line, both currents are added to the base of transistor Tr1 through diodes D3 and D4, and relay Y1 is continuously energized. When no current comes from the telephone line, only the current running through diode D4 is supplied to the base of transistor Tr1, causing relay Y1 to be energized. Under such conditions, contact y11 is continuously held in an open condition, thus allowing for condenser C5 to gradually charge. After a certain period, determined by the charging rate of C5, transistor Tr5 turns ON and transistor Tr6 turns OFF, and relay Y2 is released. The releasing of relay Y2 returns the apparatus to a stand-by state to await the next call.

Figure 5:
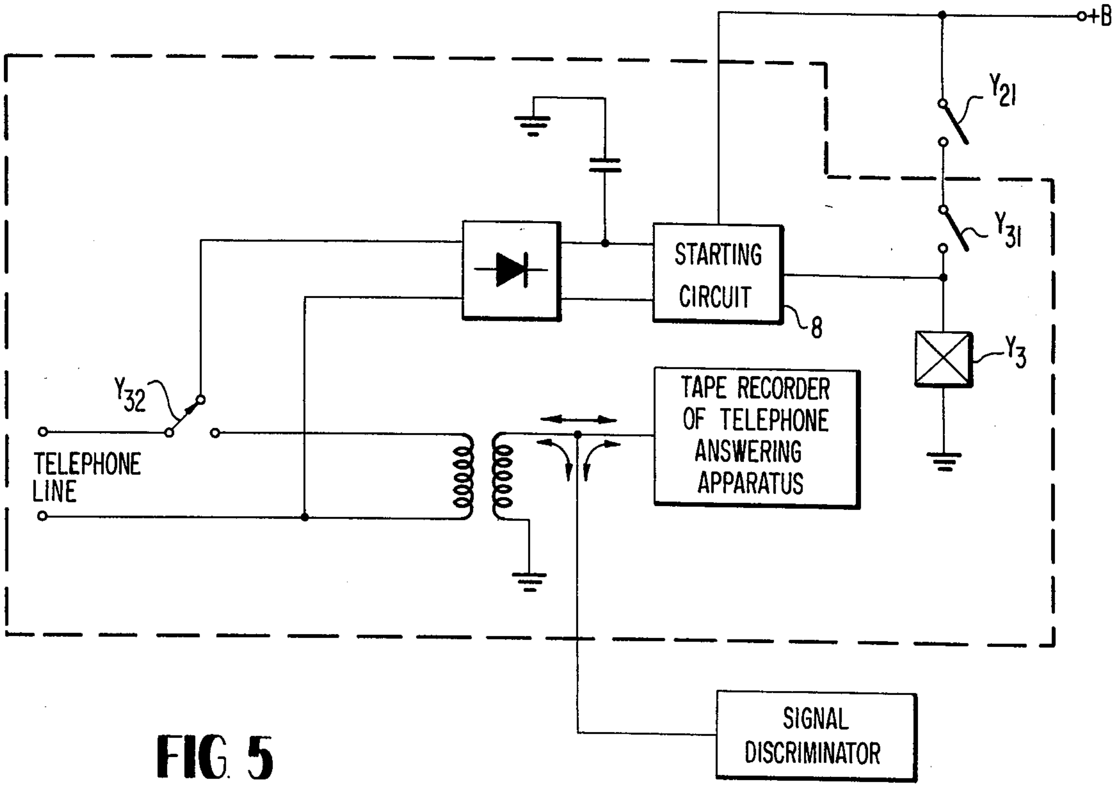
FIG. 5 shows a prior art telephone answering apparatus incorporating the present invention.

FIG. 5 illustrates a prior art telephone answering apparatus which includes the signal discriminator of the present invention. When a ringing signal is initially received over the telephone line, relay Y3 is energized by means of the starting circuit 8. The energization of relay Y3 switches contact *y*31 and *y*32. *y*21 is in a normally closed position since relay Y2 is normally energized. If after the initial energization of relay Y3 a ringing signal is received, relay Y2 will become deenergized as discussed above, thus opening relay contact *y*21 thereby deenergizing relay Y3 thus returning the prior art device to its standby condition. When returned to the standby condition, relay Y1 will become deenergized, contact *y*11 will return to its normally closed position, relay Y2 will again become energized and contact *y*21 will return to its normally closed position. Thus, the discriminator circuit will also be returned to its standby state.

The prior art automatic telephone answering device illustrated in FIG. 5 is shown in FIG. 1 of U.S. Pat. No. 3,641,270. The correspondence between the central elements of FIG. 5 of this Application and FIG. 1 of this patent will now be presented. Contacts $Y_{32}$ of FIG. 5 correspond to contacts $Y_{11}$ of the patent; relay $Y_3$ to the block labelled RELAY; the starting circuit 8 to circuit 13; the "tape recorder of telephone answering apparatus" to the elements 15, 16 and 17; and the rectifier at the input of the starting circuit 8 to the rectifier circuit 12. The "signal discriminator" of FIG. 5 is then obviously connected to the junction between the transformer 18 and amplifier 17 of the patent.

According to the present invention, as described hereinabove, only a voice signal can be selected from among several various signals. The apparatus remains in its recording state only when a voice signal is received.

What is claimed is:

1. A signal discriminator of an automatic telephone answering apparatus, comprising:

a. a rectifier circuit means for rectifying an input signal received from a telephone line, b. a first monostable switching circuit means coupled to said rectifier circuit means, said first switching circuit means being triggered from a first, stable state to a second state in response to a pulse or other discernible component of a fluctuating input signal received from said rectifier circuit means, c. first timer circuit means associated with said first monostable switching circuit means said timer circuit means providing a switching signal said switching signal being interrupted for a predetermined period following each triggering of said first monostable circuit means to said second state, d. second switching circuit means responsive to both the output signal from said rectifier circuit means and said switching signal whereby said second switching circuit means is switched to a first state upon receiving either or both of said signals and to a second state upon receiving neither of said signals, and, e. a third monostable switching circuit means for controlling the telephone answering apparatus, said third switching circuit means being responsive to actuation of the said second switching circuit means such that when the latter is in said second state said third switching circuit means is triggered from a first state to a second state, and said third switching circuit means returns to its stable first state after said second switching circuit means has been maintained in its first state from a predetermined period.

2. A signal discriminator as claimed in claim 1, wherein said predetermined period for which said switching signal is interrupted has a duration of order of 0.25 seconds, whereby upon receipt of incoming signals which are either continuous or intermittent with components of duration greater than 0.25 seconds said third switching circuit means is switched to said first state, to render a telephone answering device inoperative, and upon receipt of intermittent or fluctuating incoming signals having signal components of duration less than 0.25 seconds, said third switching circuit means is switched to said second state, to render the telephone answering apparatus operative to record the incoming signal.

3. A signal discriminator as claimed in claim 1, wherein said timer circuit means comprises a first series resistorcapacitor time constant circuit connected to a power source, the common point between said resistor and capacitor being connected to said second switching circuit means, said first switching circuit means being connected via a differentiating circuit to the output of the rectifier circuit means wherein the capacitor of said first time constant circuit means is discharged when said first switching circuit means is in said second state.

4. A signal discriminator as claimed in claim 1, wherein said third switching means includes a second series resistor-capacitor time constant circuit connected to a power source, wherein when said capacitor is charged said third switching circuit means is in said first state, and wherein second switching circuit means is arranged to discharge the capacitor of said second time constant circuit when in its second state.

5. A signal discriminator claimed in claim 1, including a noise absorbing circuit means for absorbing low level noises, arranged between the output of said rectifying circuit means and the inputs of said first and second switching circuit means.

* * * * *